Patented Feb. 3, 1953

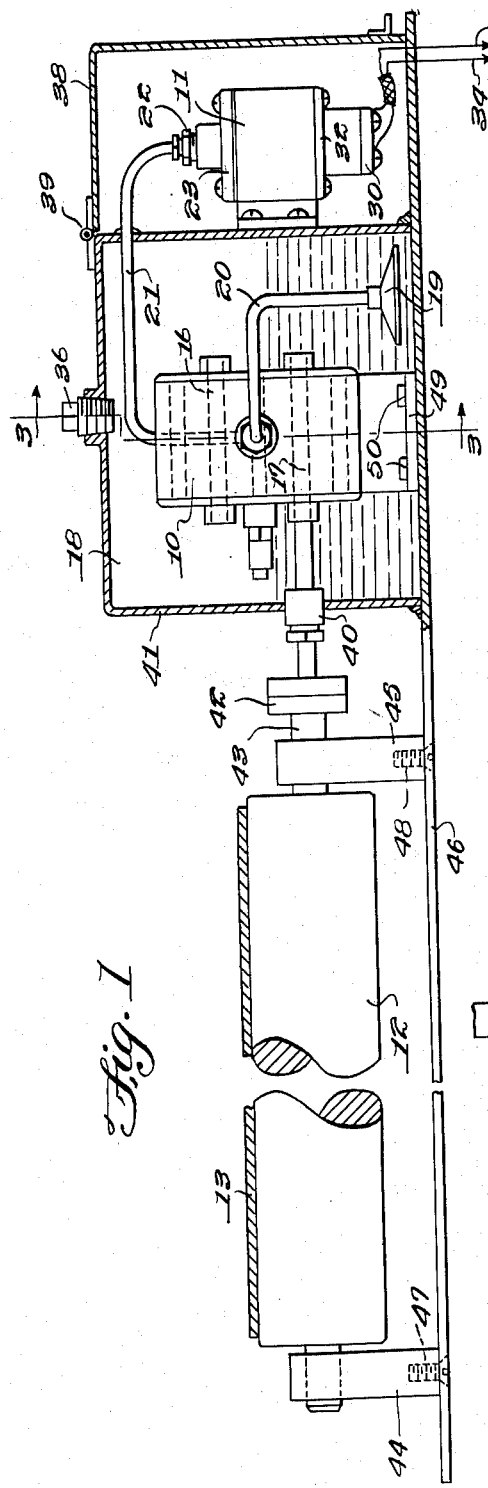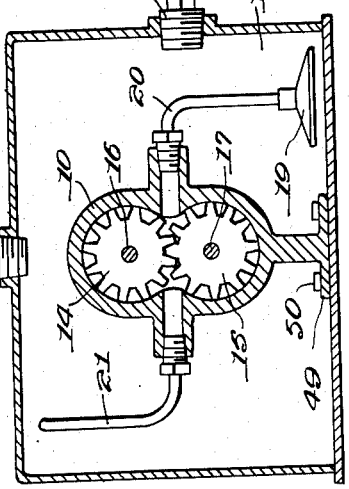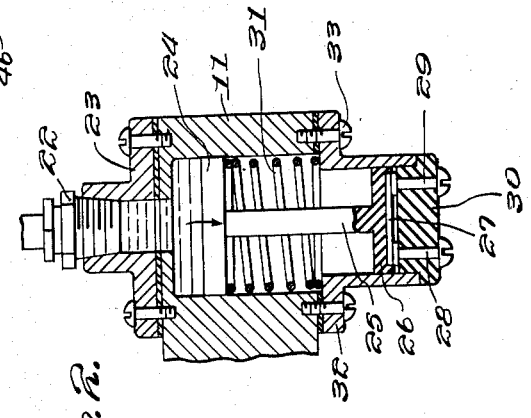

2,627,337

UNITED STATES PATENT OFFICE 2,627,337

FEEDER CONVEYER ACTUATOR

Hughie Clifford Lyons, Hyden, Ky.

Application March 17, 1950, Serial No. 150,202

3 Claims. (Cl. 198—80)

This invention relates to conveyors used in mining equipment and plants, packing houses and industrial plants where feeder conveyors at the sides feed objects and materials to a belt conveyor, and in particular the invention relates to a hydraulic switch closing device actuated by a roller of the main conveyor which holds switches of the feeding conveyors closed when the main conveyor is operating and instantly opens the switches to the feeder conveyors when the main conveyor stops.

The purpose of this invention is to provide means whereby it is substantially impossible for feeder conveyors to operate and pile up materials on a main conveyor when the main conveyor is accidently stopped.

In numerous types of plants and particularly industrial and mining plants a main conveyor extends through a building and feeder conveyors extend from the sides carrying products to the main conveyor. When the main conveyor stops accidently and the feeder conveyors continue to operate products pile up upon the main conveyor causing damage and considerable loss of time. With this thought in mind this invention contemplates a device whereby feeder conveyors are independently operated by the main conveyor so that as soon as the main conveyor stops the feeder conveyors also stop.

The object of this invention is, therefore, to provide a feeder conveyor actuator that starts the operation of the feeder conveyor when the main conveyor starts and that automatically stops the feeder conveyor when the main conveyor stops.

Another object of the invention is to provide a safety device for preventing feeder conveyors continuing to feed products to a main conveyor when the main conveyor stops that may be incorporated in conveyor installations now in use.

A further object of the invention is to provide a safety device for stopping feeder conveyors as a main conveyor stops which is of a simple and economical construction.

With these and other objects and advantages in view the invention embodies a hydraulic pump actuated by a roller of a main conveyor and a pressure actuated switch connected in circuits through feeder conveyors and actuated by the hydraulic pump.

Other features and advantages of the invention will appear from the following description taken in connection with the drawings wherein:

Figure 1 is a view showing a cross section through a main conveyor with the feeder conveyor actuating pump and switch incorporated in a housing and in which the housing is shown in section.

Figure 2 is a detail showing a longitudinal section through the pressure actuated switch that is incorporated in the circuit to the feeder conveyor.

Figure 3 is a cross section through the pump taken on line 3—3 of Figure 1.

Referring now to the drawings wherein like reference characters denote corresponding parts the feeder conveyor safety device of this invention includes a hydraulic pump 10, a pressure actuated switch 11 and a roller 12 that is positioned to be rotated by a conveyor belt 13.

It will be understood that any suitable hydraulic pump may be used and in the design shown a gear pump is illustrated wherein gears 14 and 15 on shafts 16 and 17, respectively pump oil or other liquid from a housing 18 through a strainer 19 on a tube 20, discharging the oil through a connection 21 which is connected to the pressure switch 11 through a plug 22 in a cap 23 on the upper end of the housing, and pressure pumped through the tube actuates a piston 24 on a piston bar 25 whereby a disc 26 on the lower end thereof moves a contact bar 27 downwardly to engage contacts 28 and 29 in an insulated bushing 30. The piston is resiliently held upwardly by a spring 31 and the contacts are positioned in a cap 32 geared to the lower end of the switch by screws 33.

The contacts 28 and 29 are connected by wires 34 and 35 to motors of feed belts positioned along the belt 13.

The housing 18 is provided with a filling plug 36 and a drain plug 37 and a cover 38 is hinged to one side of the housing by a hinge 39, thereby providing a cover for the pressure switch 11.

The lower shaft 17 of the pump extends through a coupling 40 in an end wall 41 of the housing 18 and the end thereof is connected by a flexible coupling 42 to the shaft 43 of the roller 12. The shaft 43 is journaled in pillow blocks or bearings 44 and 45 which are mounted upon a base 46 by screws 47 and 48, respectively.

The pump 10 is also mounted on the base 46 through a base flange 49 with bolts 50 securing the base flange to the base 46.

With the parts arranged in this manner the roller 12 is rotated with the belt 13 in operation and when the main conveyor is started the roller 12 operates the pump 10 which builds up pressure through the liquid pumped thereby in the pressure switch 11 and the pressure switch closes the circuit to a feeder conveyor. As soon as the main conveyor stops the motor or pump also stops and as pressure is relieved on the switch the spring 31 actuates the plunger or piston to open the contacts, thereby stopping the motor of the feeder conveyor.

It will be understood that modifications may be made in the design and arrangement of the parts without departing from the spirit of the invention.

What is claimed is:

1. In a safety device for use in operating feeder conveyors, the combination which comprises a main belt conveyor, a transversely positioned roller extended across the belt of the main conveyor, means mounting the said roller whereby the roller is in contact with the under surface of the belt of the conveyor, a shaft extended from the roller, a fluid pump having a shaft aligned with the shaft of the roller in engagement with the belt of the main conveyor, a coupling connecting the ends of the shafts of the roller and pump, a fluid pressure actuated switch, and a connection from the discharge side of the pump to the switch for closing the switch as the motor is operated by the roller.

2. In a safety device for feeder conveyors, the combination which comprises a main belt conveyor, a transversely disposed shaft positioned across the belt of the main conveyor, a roller carried by the shaft, means journaling the shaft with the roller in engagement with the under surface of the belt of the conveyor, a hydraulic pump mounted on said shaft, a liquid container in which the pump is positioned, a cylinder, a piston having a piston rod extended therefrom slidably mounted in the cylinder, spaced contacts positioned in one end of the cylinder, a connection extended from the discharge side of the hydraulic pump to the cylinder on one side of the piston, a spring positioned in the cylinder and on the opposite side of the piston for urging the piston toward the connection to the pump, insulated spaced contacts positioned in the cylinder, means bridging the contacts by the piston through the stem thereof when pressure is applied to the cylinder by the pump, and means whereby the said contacts are connected in a circuit to the motor of the feeder conveyor whereby as the roller is rotated by the belt of the main conveyor the circuit is completed to the motor of a feeder conveyor.

3. In an actuator for use on a feeder conveyor, a roller positioned to be rotated by a belt of a main conveyor, a pump, means operating the pump by the roller, a pressure switch adapted to be connected in a circuit of a motor for a feed conveyor and means connecting the pump to the pressure switch whereby the pressure switch is actuated to close a circuit to said motor.

HUGHIE CLIFFORD LYONS.

REFERENCES CITED

The following references are of record in the file of this patent:

UNITED STATES PATENTS

| Number | Name | Date |
|---|---|---|
| 1,044,609 | Watson | Nov. 19, 1912 |
| 1,714,431 | Lissen | May 21, 1929 |
| 2,371,956 | Dees | Mar. 20, 1945 |
| 2,372,131 | Smith | Mar. 20, 1945 |

FOREIGN PATENTS

| Number | Country | Date |
|---|---|---|
| 268,510 | Italy | May 3, 1929 |